United States Patent
Baba et al.

(10) Patent No.: US 8,934,724 B2
(45) Date of Patent: Jan. 13, 2015

(54) IMAGE RECOGNITION DEVICE, IMAGE RECOGNIZING METHOD, STORAGE MEDIUM THAT STORES COMPUTER PROGRAM FOR IMAGE RECOGNITION

(75) Inventors: Takayuki Baba, Kawasaki (JP); Shugo Nakamura, Yokohama (JP); Masaki Ishihara, Kawasaki (JP); Masahiko Sugimura, Meguro (JP); Susumu Endo, Kawasaki (JP); Yusuke Uehara, Kawasaki (JP); Daiki Masumoto, Kawasaki (JP); Shigemi Nagata, Kawasaki (JP); Hirohisa Naito, Fuchu (JP); Akira Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 13/471,886

(22) Filed: May 15, 2012

(65) Prior Publication Data

US 2013/0004081 A1    Jan. 3, 2013

(30) Foreign Application Priority Data

Jun. 30, 2011 (JP) ................................. 2011-146077

(51) Int. Cl.
G06K 9/62 (2006.01)
G06K 9/00 (2006.01)

(52) U.S. Cl.
CPC ........ *G06K 9/00711* (2013.01); *G06K 9/00677* (2013.01)
USPC ....................................................... 382/227

(58) Field of Classification Search
USPC ....................................................... 382/227
See application file for complete search history.

(56) References Cited

U.S. PATENT DOCUMENTS

2005/0129285 A1  6/2005 Mino et al.
2007/0154100 A1* 7/2007 Au et al. ....................... 382/226
2009/0208106 A1* 8/2009 Dunlop et al. ................ 382/173

(Continued)

FOREIGN PATENT DOCUMENTS

JP  2003-134412   5/2003
JP  2005-129021   5/2005
JP   2006-53802   2/2006

OTHER PUBLICATIONS

Tomasz Malisiewicz et al, "Recognition by Association via Learning Per-exemplar Distances", Proceedings of the IEEE Computer Society Conference on Computer Vision and Pattern Recognition (CVPR), Jun. 28, 2008, pp. 1-8.

(Continued)

*Primary Examiner* — Brian P Werner
(74) *Attorney, Agent, or Firm* — Staas & Halsey LLP (57) ABSTRACT

An image identifying device includes: a setting unit which sets a section having at least one image in a video; a first recognizing unit which calculates a plurality of feature amounts related to at least the one image and which acquires a plurality of identification results corresponding to each of the feature amounts from an identifier which may identify a plurality of objects belonging to a first category; a selecting unit which selects, based on the identification results, a second category of a third category; and a second recognizing unit which calculates another feature amount related to an image included in another section and acquires another identification result corresponding to the feature amount from another identifier which may identify the objects included in the second category.

15 Claims, 4 Drawing Sheets

(56) References Cited

U.S. PATENT DOCUMENTS

2011/0026840 A1\* 2/2011 Tao et al. .................. 382/224
2012/0123978 A1\* 5/2012 Toderice et al. ............. 706/12

OTHER PUBLICATIONS

Japanese Notification of Reasons for Refusal dated Nov. 18, 2014 in Japanese Application No. 2011-146077.

\* cited by examiner

IMAGE RECOGNITION DEVICE, IMAGE RECOGNIZING METHOD, STORAGE MEDIUM THAT STORES COMPUTER PROGRAM FOR IMAGE RECOGNITION

CROSS-REFERENCE TO RELATED APPLICATIONS

This application is based upon and claims the benefit of priority from the prior Japanese Patent Application No. 2011-146077 filed on Jun. 30, 2011, the entire contents of which are incorporated herein by reference.

FIELD

The embodiments discussed herein are related to an image recognition device that recognizes, for example, an object included in a video, an image recognizing method, and a storage medium that stores a computer program for image recognition.

BACKGROUND

It is preferable that a label indicating a name of various objects included in a video is added to the video. For example, if the above-described label is attached to a television program image, a broadcast station may search desired images if necessary from among many television program images. However, manually attaching the labels to the video takes huge amount of time and effort.

In recent years, a technique for automatically recognizing the name of the object included in the image has been studied. For example, there is a technique disclosed in T. Malisiewicz and A. A. Efros, "Recognition by association via learning per-exemplar distances", Proceedings of the IEEE Computer Society Conference on Computer Vision and Pattern Recognition (CVPR), 2008, p. 1-8. If it is possible to automate the operation for adding labels to videos by using the above-described technique, the operation for adding the labels is efficient.

On the other hand, a technique for adding additional information to the video according to the content of the video has been proposed. For example, there is a technique for adding the program information related to each program broadcasted by digital broadcast and the genre of the program to the video. Furthermore, for example, there is a technique for extracting a frame in which the telop character is displayed from the image and recognizing the telop character. With reference to the database in which the font of the character corresponds to the image type, the technique determines the image type corresponding to the font of the recognized telop character. The above-described techniques are disclosed in, for example, Japanese Laid-open Patent Publication No. 2003-134412 and Japanese Laid-open Patent Publication No. 2006-53802.

SUMMARY

According to an aspect of the invention, an image identifying device includes: a setting unit which sets a section having at least one image from among a plurality of images included in a video; a first recognizing unit which calculates a plurality of feature amounts related to at least the one image and which acquires a plurality of identification results corresponding to each of the feature amounts from an identifier which may identify a plurality of objects belonging to a first category; a selecting unit which selects, based on the identification results, a second category having some objects from among the plurality of objects belonging to the first category instead of a third category having other objects with at least one object different from the some objects; and a second recognizing unit which calculates another feature amount related to an image included in another section different from the section and acquires another identification result corresponding to the feature amount from another identifier which may identify the objects included in the second category.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The conventional technique uses information that is added to a video in advance. Therefore, the embodiment is not applicable if the information is not added to the video in advance. According to the technique for recognizing the object included in the image, an object recognizer that recognizes all objects that are assumed to be included in the image is used. Actually, however, in most cases, simply some parts of the objects to be recognized by the object recognizer are included in the video. Since the object identifier is formed to recognize many objects, the conventional object identifier may cause wrong recognition. The wrong recognition means that the object identifier wrongly recognizes that the object is included in the video even though the object is not actually included in the video.

The technique disclosed in the following embodiments may improve the recognition accuracy of the object included in the video.

Figure 1:
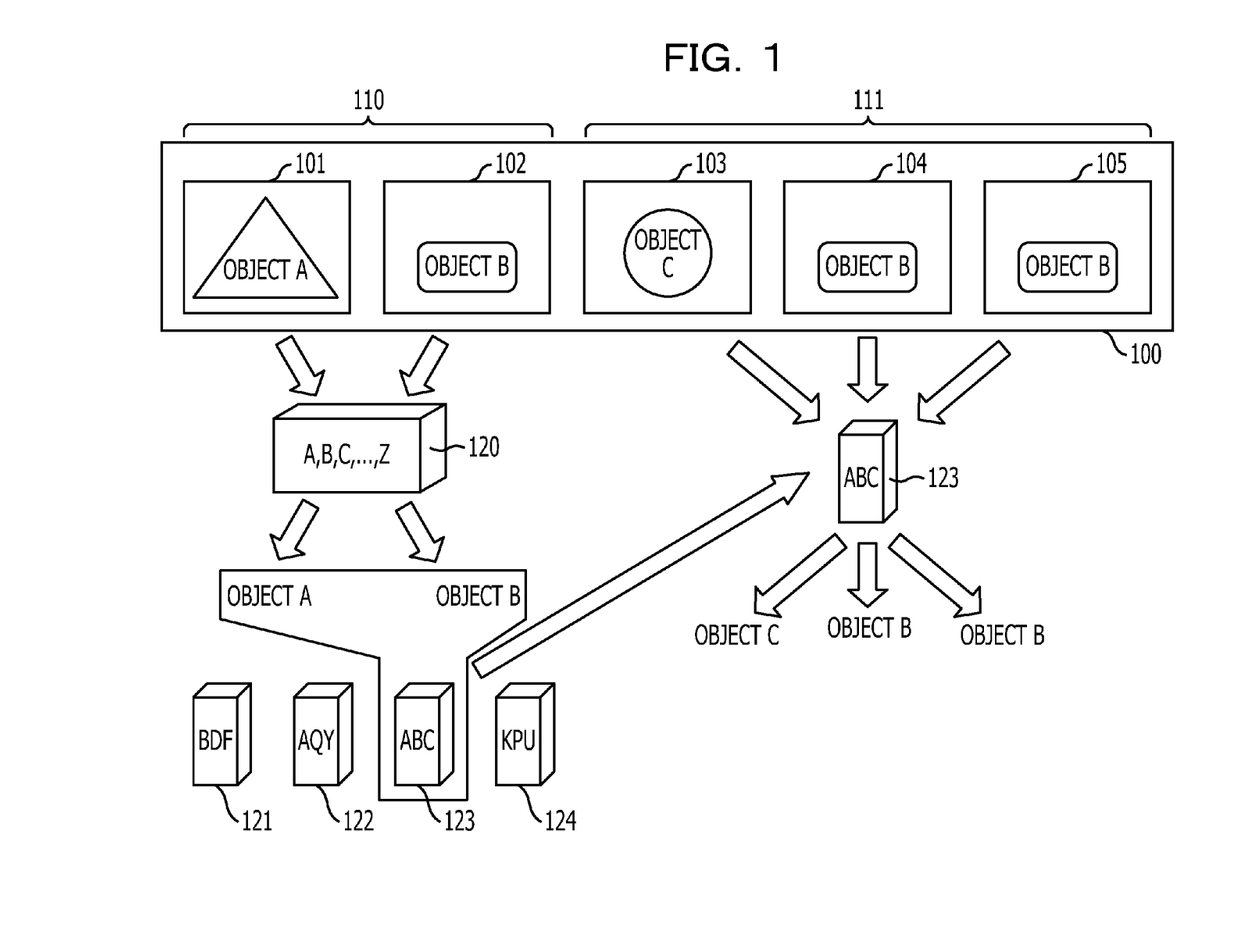
FIG. 1 is a diagram illustrating image recognizing processing performed by an image recognition device according to an embodiment.

With reference to the diagrams, an image recognition device according to an embodiment will be described. The image recognition device recognizes an object included in each image included in the video. FIG. 1 is a diagram illustrating image recognizing processing that is executed by the image recognition device. In FIG. 1, the object, which is included in images 101 and 102 included in a section 110 as a part of the input video 100 is recognized by using a general object identifier 120 that recognizes all the objects A to Z included in a prescribed category. The predetermined category is a type of first category. For example, an object A is recognized from the image 101, and an object B is recognized from the image 102. Based on the recognized objects A and B, an individual object identifier 123 that identifies simply an object belonging to a sub-category is selected from the individual object identifiers 121 to 124. The object that is to be recognized by the individual object identifier is limited. The sub-category is a category to which the object included in each image included in the video 100 is estimated to belongs. The sub-category is a type of second category and third category. By using the individual object identifier 123, the objects included in the images 103 to 105 included in a section 111 of the rest of the video are recognized. By recognizing the object included in the images 103 to 105 by using the individual object identifier 123, a possibility for wrongly recognizing an object that may not be included in the images 103 to 105 is reduced. As a result, the recognition accuracy of the object is improved.

The image may be either a frame or a filed. The frame is a single still image included in the video. On the other hand, the field is a still image obtained by acquiring simply the data in even numbered rows or in odd numbered rows from the frame. The video includes a plurality of images time-sequentially arranged.

Figure 2:
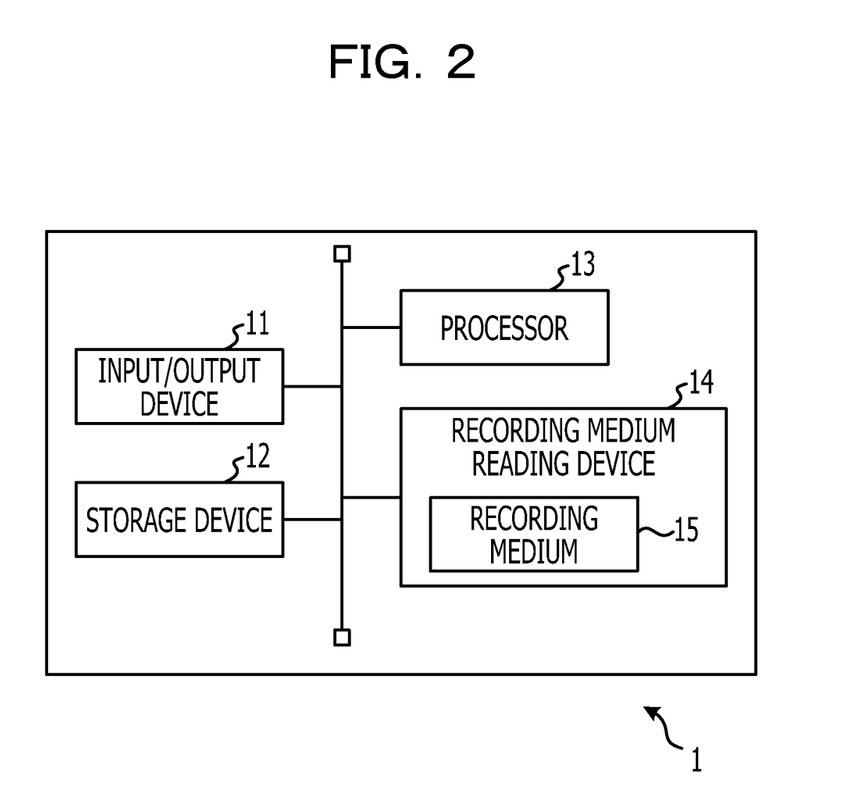
FIG. 2 is a diagram illustrating a configuration of an image recognition device according to an embodiment.

FIG. 2 is a diagram illustrating a hardware configuration of an image recognition device according to an embodiment. An image recognition device 1 includes an input/output device 11, a storage device 12, a processor 13, and a storage medium reading device 14. The image recognition device 1 recognizes the object included in the video obtained through the input/output device 11.

The input/output device 11 includes a video signal interface, which is used to couple the image recognition device 1 to a video input device (not illustrated) such as a camcorder or an image display device (not illustrated) such as a liquid crystal display, and a control circuit thereof. Alternatively, the input/output device 11 may include a communication interface, which is used to couple the image recognition device 1 to a communication network in accordance with a communication standard such as Ethernet, and the control circuit thereof. The input/output device 11 obtains a video from the video input device or through the communication network and then sends the video to the processor 13.

The input/output device 11 receives information related to the object recognized from the video from the processor 13. The input/output device 11 outputs the information related to the object recognized from the video to the image display device such as a liquid crystal display. Alternatively, the input/output device 11 may transmit the information about the object recognized from the video to another apparatus coupled to the image recognition device 1 through the communication network.

The storage device 12 includes, for example, a semiconductor memory that is volatile or non-volatile. The storage device 12 stores the computer program executed by the image recognition device 1, various parameters used to recognize an object from a video, and the like. The storage device 12 may store the obtained video. The storage device 12 may store information, such as a type and a name of the object recognized from the video, with the video.

If a storage medium 15 is inserted, the storage medium reading device 14 reads and sends the information or the computer program stored in the storage medium 15 to the processor 13. Alternatively, the record medium reading device 14 writes the information received from the processor 13 into the storage medium 15. The storage medium 15 is a semiconductor memory, a magnetic disk, or an optical disk. For example, if the storage medium 15 is a semiconductor memory, the storage medium reading device 14 includes an interface circuit that communicates with the semiconductor memory, such as, for example, an interface circuit compliant with Universal Serial Bus. If the storage medium 15 is an optical disk, the storage medium reading device 14 includes a drive device of the optical disk. The information stored in the storage medium 15 is, for example, various parameters used to recognize an object from a video or a video as a target of the image recognizing processing.

The processor 13 includes one or several processors, a memory circuit such as a random access memory, and a peripheral circuit. The processor 13 recognizes the object included in the video. Furthermore, the processor 13 controls the whole image recognition device 1.

Figure 3:
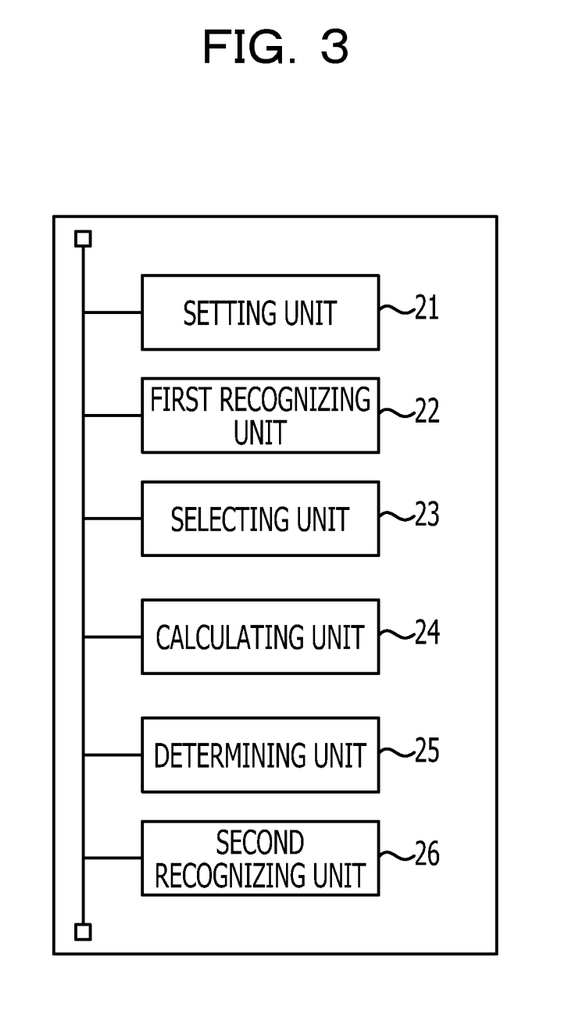
FIG. 3 is a functional block diagram of a processing device.

FIG. 3 is a functional block diagram of the image recognition device 1. The image recognition device 1 functions as a setting unit 21, a first recognizing unit 22, a selecting unit 23, a calculating unit 24, a determining unit 25, and a second recognizing unit 26. Each processor is a function module that is mounted according to a computer program executed on a processor included in the processor 13. Alternatively, each processing unit may be mounted on the image recognition device 1 as a separate calculation circuit. Alternatively, the units of the processor 13 may be mounted on the processor 13 as a one integrated circuit by obtained by integrating the circuits corresponding to the units.

By setting an inspection section as a target of the processing by the first recognizing unit 22, the setting unit 21 selects an image to be processed. The inspection section is a time interval that is set to include at least one image. For example, the setting unit 21 firstly sets a predetermined section that is set in advance to start from a video as an inspection section. If the determining unit 25 determines that the inspection section is inappropriate, the setting unit 21 extends the inspection section by a predetermined additional section. The determining unit 25 will be described below in detail.

For example, the length of the predetermined section is set to $1/100$ to $1/10$ of the time length of the whole video. The length of the predetermined section may be set to a period, for example, 1 to 10 minutes regardless of the time length of the whole video. Furthermore, the predetermined section may be set to include the end of the video instead of the beginning of the video. Alternatively, the predetermined section may be set to start at a predetermined time from the beginning of the video, for example, the elapsed time of 5 to 30 minutes. Moreover, the predetermined section does not have to be one sequent section. For example, the predetermined section is set to include a plurality of images arranged in an interval of 1 to 10 minutes.

The length of the additional section is set to $1/100$ to $1/20$ of the time length of the whole video, for example. The length of the additional section may be, for example, 30 seconds to 5 minutes regardless of the time length of the whole video. When setting the inspection section, the setting unit 21 stores the time indicating the beginning of the inspection section and the time indicating the end of the inspection section in the storage device 12 and also reports the times to the first recognizing unit 22. Hereinafter, the section other than the inspection section in the video is referred to as a non-inspected section.

By using a general object identifier that recognizes all the objects belonging to a predetermined category with respect to at least one image in the inspection section, the first recognizing unit 22 recognizes the object included in the image.

At this time, the predetermined category is determined in advance according to a purpose of information related to the object recognized from the video, for example. For example, the predetermined category is determined to categorize the videos into genres such as "sports" and "drama" and to include all the objects that are useful to retrieve a specific scene. Alternatively, the predetermined category may be determined to include simply the object that has a possibility of appearing in a video of a specific genre.

The object according to the present embodiment may include not simply objects such as "person" and "car" occupying a specific range in a real space but also "sky" that does not have a clear range. The object according to the present embodiment may include a character or a figure such as "alphabet," or "rectangular." Moreover, the objects such as "red car" and "blue car" that belong to the similar category and have different features that are identifiable on the image may be individual.

Regarding each of the images, the first recognizing unit 22 recognizes the object according to the following procedures. The first recognizing unit 22 divides one image in the inspection section into a plurality of regions. The first recognizing unit 22 extracts at least one feature amount indicating the feature of the object to be recognized from the regions, respectively. By inputting the extracted feature amount into a general object identifier for each region, the first recognizing unit 22 recognizes the object included in the region.

Specifically, the first recognizing unit 22 divides the image into a plurality of regions so that each object included in the image is included in the regions, respectively. Therefore, the first recognizing unit 22 has an integral pixel as one region in which the pixel value is within a predetermined range, for example. The first recognizing unit 22 has an integral pixel as another region in which the pixel value is not within the predetermined range. In this case, the predetermined range is set in advance according to an assumed object, for example. The image pixel value may be any of the color component values of RGB color system, for example. Alternatively, the first recognizing unit 22 converts the color component value of each pixel of the image into a value of HSV color system or HLS color system, and a color phase, a chroma, or a luminance value in the HSC color system or the HLS color system may be a pixel value.

The first recognizing unit 22 couples the pixel with the difference between the target pixel and the pixel value is within the predetermined range from among the pixels adjacent to the target pixel in the image. For example, the pixel of the upper left end of the image is employed as a target pixel. The predetermined range is set to have the maximum value of the difference of the image pixels that form an image of a object. The first recognizing unit 22 repeats the similar processing on the pixel coupled to the target pixel as another target pixel. The first recognizing unit 22 has a pixel assembly as a first region. By setting another target pixel from among the pixels that are not included in the first region and repeating processing that is equivalent to the above-described processing, the first recognizing unit 22 may divide the image into a plurality of regions.

Alternatively, the first recognizing unit 22 may divide the image into a plurality of regions according to other various methods for dividing the image into the plurality of regions. For example, the first recognizing unit 22 categorizes the pixel values of the pixels in the image into a plurality of clusters according to a clustering method such as k-means method. The first recognizing unit 22 has an integral pixel belonging to each cluster as a single region. After dividing the image into the plurality of regions, the first recognizing unit 22 may perform expansion and contraction calculation of morphology or contraction and expansion calculation on at least one region from among the plurality of regions to solve the isolated point. By performing labeling processing on each region, the first recognizing unit 22 may have each sub-region as an individual region if a plurality of sub-regions that is separated from each other.

The first recognizing unit 22 extracts at least one feature amount from among the plurality of regions of the image. Regarding the target region from among the regions, the first recognizing unit 22 acquires a color histogram, as a feature amount, that indicates an appearance frequency for each of the color components. Alternatively, the first recognizing unit 22 may extract the feature amount that is determined based on a form or texture of the target region. For example, the first recognizing unit 22 may calculate the pixel included in the target region, and a length-to-width ratio or circularity of the target region as the feature amount. Based on the area S of the target region and the circumference length L of the target region, the circularity is expressed as $(4\pi S/L^2)$. In this case, S means a pixel included in the target region. The first recognizing unit 22 may have a wavelet coefficient as a feature amount obtained by wavelet transforming the target region. Further, the first recognizing unit 22 may calculate a Haar-like feature amount or a Histograms of Oriented Gradients (HOG) feature amount in the target region. Moreover, the first recognizing unit 22 may acquire the statistic of the pixel value in the target region, for example, such as dispersion of color components, a difference between the minimum luminance value and the maximum luminance value or the average luminance value as a feature amount.

For each region of the plurality of images, the first recognizing unit 22 inputs the feature amount vector based on the acquired feature amount into the general object identifier. A feature vector is a vector with a single element as each feature amount. The general object identifier recognizes the object included in each region based on the input feature amount vector.

The general object identifier is a machine learning system, which is configured by so-called learning with teacher, such as the multilayer perceptron, the support vector machine, or the k-nearest neighbor algorithm. To make the general object identifier learn the features of the objects, the plurality of sample images are prepared in advance for all the objects belonging to predetermined categories. It is preferable that a plurality of sample images that includes no object to be recognized is prepared. For each of the sample image, the same type of the feature amount of the type that is equivalent to the feature amount extracted by the first recognizing unit 22. The feature amount vector with the feature amount as an element extracted from the sample image is input into the general object identifier, the general object identifier learns by using a learning method according to a machine learning system for forming the general object identifier.

For example, if the general object identifier is a multilayer perceptron, the general object identifier learns according to a learning method called backpropagation. The general object identifier may include a plurality of support vector machines prepared for each object to be recognized. Basically, the support vector machine is a two-class identifier. Therefore, each of the support vector machines learns by using, for example, a method called kernel trick in such a way that the determining result, which indicates whether the object to be recognized is not included, is output according to the input feature amount vector.

The parameter indicating the machine learning system that forms the general object identifier, the weighting between the units and the bias of the units included in the multilayer perceptron, or each support vector of the support vector machine is stored in advance in the storage device 12.

If the first recognizing unit 22 inputs the feature amount vector into the general object identifier according to each of the regions of the image, the general object identifier outputs the value indicating the type of the object included in each of the regions. If the object to be recognized is not included in the region, the general object identifier outputs the value indicating the object is not included. The first recognizing unit 22 stores all the values indicating the types of the objects recognized from the images in the inspection section in association with the inspection sections in the storage device 12. The first recognizing unit 22 reports all the values indicating the types of the objects recognized from the images in the inspection section to the selecting unit 23. The first recognizing unit 22 calculates the recognized frequency of each of the recognized objects and may report the frequency to the selecting unit 23. The first recognizing unit 22 does not divide each image into a plurality of regions, extracts the feature amount from the whole image, and recognizes the object by inputting the feature amount vector with a feature amount as an element into the general object identifier.

Based on the object recognized from the images in the inspection section, the selecting unit 23 selects the sub-category to which the object included in the input video belongs. The sub-category is a category obtained by categorizing the categories with a plurality of objects identified by the general object identifier used by the first recognizing unit 22 into a plurality of categories. That is, the sub-category is selected from among the plurality of sub-categories including some objects from among the objects belonging to the category. Furthermore, the selecting unit 23 acquires the certainty degree indicating that the object included in the video is included in the object of the selected category. The selecting unit 23 may categorize the input videos into the groups corresponding to the selected sub-categories from among the groups indicating the genre of the video corresponding to each of the plurality of sub-categories.

The sub-categories are set to be different from each other at least one part of the belonging object for each sub-category. For example, a first sub-category related to ball sports and a second sub-category related to motor sports are set in advance. In this case, the objects belonging to the first sub-category includes, for example, "ball," "person," and "grass". On the other hand, the objects belonging to the second sub-category includes, for example, "car," "motorcycle," and "road." The sectioning of sub-category may be performed in a point of view different from the genre of the general images such as sports and dramas. For example, a sub-category in which the object (for example, such as an ocean and a specific logo mark) that may be included in a specific scene and a sub-category to which the objects that may be included in another scene may be set.

The selecting unit 23 inputs the information indicating the recognized object into the group identifier to select the sub-category. The information indicating the recognized object is, for example, a pair of values indicating the types of the recognized objects. The group identifier outputs the identification number and the certainty degree of the sub-category according to the input. For example, "1" is set to "person," "2" is set to "car," "3" is set to "ball," and "4" is set to "sky." If the recognized objects are "person" and "sky," "1" and "4" are input into the group identifier. Alternatively, the selecting unit 23 may input the value indicating whether each of the objects belonging to a predetermined category is recognized by the general identifying processing and a vector included as an element into a group identifier. For example, if the value of the element is '1,' the element indicates that the corresponding object is recognized, and if the value of the element is '0,' the element indicates that the corresponding object is not recognized. For example, as described above, the objects belonging to a predetermined category are "person," "car," "ball," and "sky," and, the elements of the vector to be input into the group identifier indicate whether the objects "person," "car," "ball," and "sky," are recognized in this order. If the recognized objects are simply "person" and "sky," a vector (1,0,0, 1) is input into the group identifier.

The group identifier is formed by learning with teacher, for example. For example, the group identifier works as a machine learning system such as a decision tree, the multilayer perceptron, the support vector machine, or the k-nearest neighbor method. For a sub-category, a plurality of pairs of numbers indicating the types of the objects belonging to each category is prepared as sample data used to learn the group identifier. When the pair of numbers indicating the types of the objects corresponding to the specific sub-category is input into the group identifier, the identification number of each sub-category is output. In this manner, the group identifier learns by using a learning method according to the machine learning system for forming the group identifier.

The group identifier is formed to have a frequency for each of the recognized objects as an input. In this case, the sample data used for learning of the group identifier includes the pair of the numbers indicating the types of the objects and the frequency of the object.

By additionally inputting a pair of values indicating the types of the recognized objects or the frequency for each object into the group identifier, the selecting unit 23 acquires the identification number and the certainty degree of the category to be selected.

For example, if the group identifier is formed in the multilayer perceptron, the output layer of the multilayer perceptron includes the output unit corresponding to the sub-categories, respectively. By using the value between 0 and 1, for example, the value output from each output unit indicates the certainty that the object included in the video belongs to the sub-category corresponding to the output unit. If the output value is larger, the possibility that the object included in the image belongs to the selected category is higher. Therefore, the group identifier outputs the identification of the sub-category corresponding to the output unit that outputs the highest value as the identification number of the sub-category to be selected. The group identifier outputs the highest value as a certainty degree from among the output values from each output unit.

The group identifier may include a support vector machine corresponding to each sub-category. In this case, the value of certainty output from each support vector machine is included in approximately −1 to 1, for example. The value of certainty indicates a possibility that the object included in the video belongs to a sub-category corresponding to the support vector machine. If the output value is larger, the possibility that the object included in the video is included in the selected sub-category is higher. Therefore, the group identifier outputs the identification number of the sub-category corresponding to the support vector machine that outputs the highest value as the identification number of the selected sub-category. The group identifier outputs the highest value from among the output values from each support vector machine as a certainty degree.

Furthermore, if the group identifier is a recognition model based on a k-nearest neighbor algorithm, the recognition model detects k sample data positioned near the pair of the values indicating the type of each object recognized from the inspection section. In this case, k is an integer that is equal to or more than 3. The group identifier selects the sub-category with the largest corresponding sample data from among the k sample data. From among the k sample data, the number of the sample data corresponding to the selected sub-category is m (m is an integer that is equal to or lower than k), the group identifier outputs (m/k) as the certainty degree.

The selecting unit 23 stores the identification number and the certainty degree of the selected sub-category into the storage device 12 in association with the input video. The selecting unit 23 sends the certainty degree to the calculating unit 24.

Based on the certainty degree and the prediction value of the number of appearance objects, the calculating unit 24 calculates an evaluation value indicating adequacy of the inspection section.

The prediction value of the number of appearance objects in the non-inspected section in the video is acquired according to the following formula, for example.

$$R(t,j)=S\times(T-t)\times A(j) \quad (1)$$

In this case, S indicates the number of images per unit time. And, T indicates a time length of the input whole video. And, t indicates the time length of the inspection section. Therefore, $\{S\times(T-t)\}$ included in the right side of Formula (1) indicates the total number of images included in the non-inspected section. And, A(j) indicates the average object appearance number per image with respect to the sub-category j selected by the selecting unit 23. In this case, j is an integer from 1 to M, and M is the total number of sub-categories. Furthermore, for example, A(j) is calculated as the average value of the number of objects in each image included in the plurality of sample videos prepared for each sub-category and is then stored in advance in the storage device 12. That is, according to Formula (1), when the sub-category j is selected as R(t,j) and the time length of the inspection section is t, the prediction value of the number of appearance objects is obtained.

For example, according to the following formula, the calculating unit 24 calculates the evaluation value F(t,j) in a case where the sub-category j is selected and the time length of the inspection section is t.

$$F(t,j)=D(t,j)+wR(t,j) \quad (2)$$

At this time, D(t,j) indicates the certainty degree calculated by the selecting unit 23 when the sub category j is selected and if the time length of the inspection section is t. And, w indicates a weighting coefficient. For example, w is set in advance in such a way that the maximum value of the second term of the right side in Formula (2) is substantially equal to the maximum value of the first term of the right side. Therefore, based on either a certainty degree D(t,j) or a prediction value R(t,j) of the appearance object number, the value of the evaluation value F(t,j) is prevented from being substantially determined.

As expressed in Formula (2), if the certainty degree D(t,j) is high, that is, if the possibility that the object included in the input video belongs to the selected sub-category is higher, the evaluation value F(t,j) becomes high. If the prediction value R(t,j) of the appearance object number in the non-inspected section is higher, that is, if the non-inspected section is longer, the evaluation value F(t,j) becomes high. If the prediction value R(t,j) of the appearance object number in the non-inspected section is higher, that is, if the non-inspected section is longer, the evaluation value F(t,j) becomes high.

According to Formula (2), even if the certainty degree D(t,j) is low, the evaluation value F(t,j) may be relatively higher when the prediction value R(t,j) of the appearance object number is high. In this case, however, the selected sub-category may be wrong, and the object included in the video input as a result does not belong to the selected sub-category. If the selected sub-category is wrong, there is a high possibility that the second recognizing unit 26 described below may not apply the appropriate individual object identifier to the non-inspected section. As a result, the object recognition accuracy in the non-inspected section may be reduced.

If the certainty degree D(t,j) is smaller than a threshold value H, the calculating unit 24 may calculate the evaluation value F(t,j) by substituting the low certainty degree into Formula (2) instead of the certainty degree D(t,j). In this case, the threshold value H is set to the average value of the minimum value and the maximum value obtained by the certainty degree D(t,j), for example. The threshold value H may become the minimum value of the certainty degree D(t,j) of which the rate with the wrong selection result of sub-category is higher than the rate with the correct selection result. The low certainty degree value is set to be equal to or lower than the lowest value, for example, −1 or 0. The calculating unit 24 sends the evaluation value calculated by the above-described processing to the determining unit 25.

The determining unit 25 determines whether or not the inspection section is appropriate based on the evaluation value F(t,j). For example, the determining unit 25 compares the evaluation value F(t,j) to the threshold value L. If the evaluation value F(t,j) is equal to or larger than a threshold value L, the determining unit 25 determines that the inspection section is appropriate. On the other hand, if the evaluation value F(t,j) is smaller than the threshold value L, the determining unit 25 determines that the inspection section is inappropriate. For example, regarding to each image included in the non-inspected section in the target video, the threshold value L is set in such a way that the accuracy for recognizing the object by using the specified individual object identifier for each sub-category is set to the minimum value of the evaluation value that is higher than the accuracy for recognizing the object by using the general object identifier. For example, the minimum value is acquired by acquiring the accuracy for recognizing each object by using the individual object identifier and the general object identifier with respect to the plurality of sample videos prepared for each sub-category in advance. For example, if the certainty degree D(t,j) and wR(t,j) are values within the range from 0 to 1, the threshold value L is set to 1.5 to 1.8, for example. The determining unit 25 outputs the determination result to the processor 13.

If the determining unit 25 determines that the inspection section is appropriate, the second recognizing unit 26 recognizes the object included in the image by using the individual object identifier corresponding to the selected sub-category regarding at least one image included in the non-inspected section in the input video. The processing performed by the second recognizing unit 26 is equivalent to the processing performed by the first recognizing unit 22 except the section that includes the target object and the object identifier to be used. The individual object identifier used by the second recognizing unit 26 will be described below.

Like the general object identifier, the individual object identifier works as a machine learning system such as, for example, a multi-layer parceptron, a support vector machine, or a k-nearest neighbor algorithm that is formed by learning with teacher. The individual object identifier learns in such a way that simply the objects belonging to the sub-category corresponding to the individual object identifiers are recognized. That is, a plurality of sample images is prepared for the objects belonging to each sub-category. It is preferable that a plurality of sample images includes no object to be recognized is prepared. The individual object identifier corresponding to each sub-category uses the sample image prepared for each sub-category to learn according to the method of learning with teacher corresponding to the machine learning system for forming the individual object identifier. Therefore, the individual object identifier recognizes simply the object that belongs to the corresponding sub-category. Therefore, if the correct sub-category is selected, the recognition accuracy of the object by the individual object identifier is higher than the recognition accuracy of the object by the general object identifier.

The second recognizing unit 26 reads the individual object identifier corresponding to the identification number of the selected sub-category from the storage device 12. The second recognizing unit 26 divides each image included in the non-inspected section into a plurality of regions. The second recognizing unit 26 extracts at least one feature amount from among the plurality of regions for each image. The feature amount extracted by the second recognizing unit 26 may vary according to the selected sub-category. The feature amount extracted by the second recognizing unit 26 may be different from the feature amount to be input into the general object identifier. Therefore, the second recognizing unit 26 may use the feature amount, which is suitable to recognize the object belonging to the sub-category, to recognize the object according to the selected sub-category. That is, the recognition accuracy is improved. By inputting the feature amount vector with the extracted feature amount as an element into the individual object identifier, the second recognizing unit 26 recognizes the object that is included in the region for each of the plurality of regions. By inputting the feature amount vector with the feature amount as an element extracted from the whole image, the second recognizing unit 26 may recognize the object included in the image. The second recognizing unit 26 may recognize the object regarding simply one or more images selected from the plurality of images included in the non-inspected section. The number of images in which the object is recognized may be one among 10 to 30 images, for example.

The second recognizing unit 26 stores, in the storage device 12, the types of all the objects recognized from each image in the non-inspected section in association with the non-inspected section of the target video.

Figure 4:
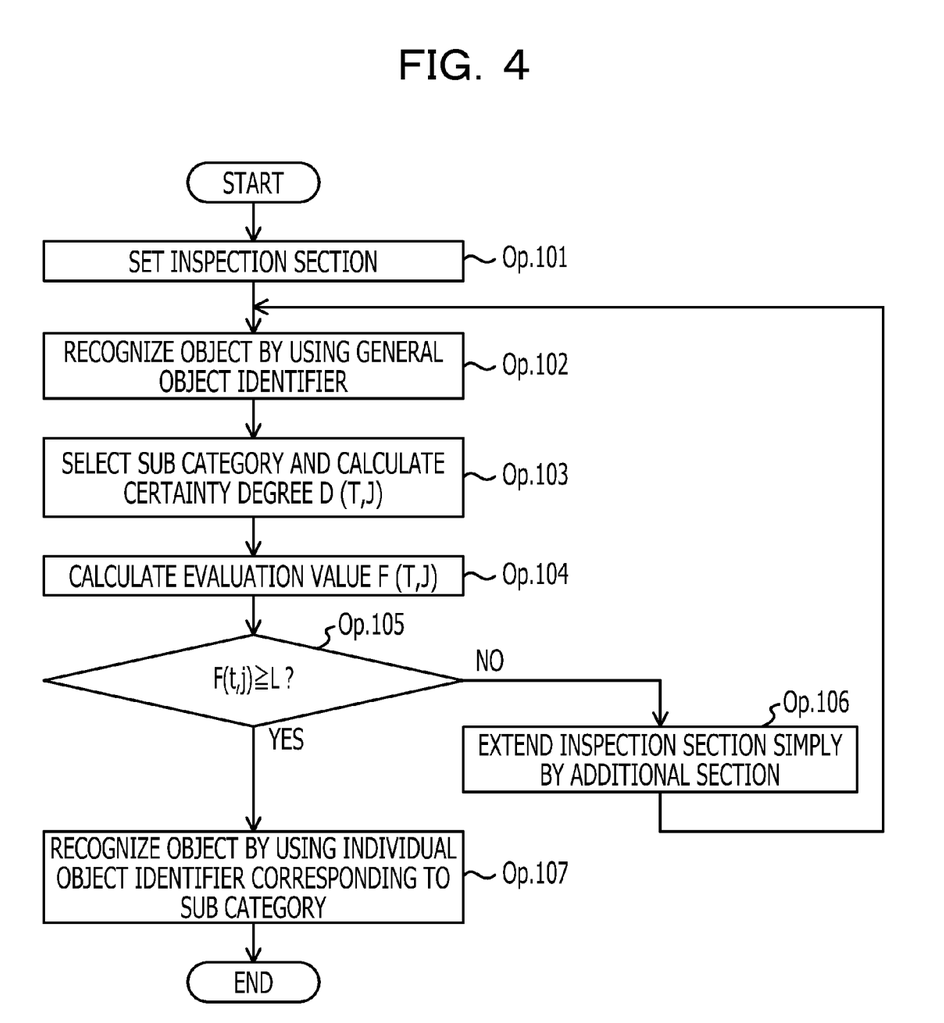
FIG. 4 is an operation flowchart of the image recognizing processing.

FIG. 4 is an operation flowchart of the image recognizing processing that is executed by the image recognition device 1. The setting unit 21 sets the inspection section to the target video (Operation Op. 101).

By using the general object identifier, the first recognizing unit 22 of the processor 13 recognizes the object included in the image for each image in the inspection section (Operation Op. 102). The selecting unit 23 of the processor 13 selects one of the plurality of categories based on the recognized object (Operation Op. 103). The selecting unit 23 calculates the certainty degree $D(t,j)$ with respect to the selected sub-category.

If one of the sub-categories is selected, the calculating unit 24 of the processor 13 calculates the evaluation value $F(t,j)$ based on the prediction value $R(t,j)$ and the certainty degree $D(t,j)$ of the number of appearance objects in the non-inspected section (Operation Op. 104). The determining unit 25 of the processor 13 determines whether the evaluation value $F(t,j)$ is equal to or larger than a threshold value L (Operation Op. 105).

If the evaluation value $F(t,j)$ is smaller than the threshold value L (No in Operation Op. 105), the setting unit 21 extends the inspection section simply by a predetermined additional section (Operation Op. 106). After that, the processor 13 repeats the process after Operation Op. 102. However, in the second processing or later in Operation Op. 102 executed, the first recognizing unit 22 may recognize the object regarding simply the image in the additional section.

On the other hand, if the evaluation value $F(t,j)$ is equal to or larger than the threshold value L (Yes in Operation Op. 105), the inspection section is appropriate. By using the individual object identifier corresponding to the selected sub-category, the second recognizing unit 26 of the processor 13 recognizes the object included in the image for each image in the non-inspected section (Operation Op. 107). After that, the processor 13 ends the image recognizing processing.

As described above, based on the result of the object recognition with respect to the image in the inspection section, the image recognition device selects one sub-category from among the plurality of sub-categories that includes some of the objects belonging to a predetermined category. By using the individual object identifier that identifies the object belonging to the selected category, the image recognition device recognizes the object included in the image in the non-inspected section in the video. Therefore, the image recognition device may reduce a possibility for wrongly recognizing the object that does not have a possibility for recognizing each image in the non-inspected section is not included. Therefore, the recognition accuracy of the object is improved. The image recognition device may limit the object to be recognized with respect to each image in the non-inspected section. Accordingly, the calculation amount of the object recognition may be controlled. The image recognition device corrects the inspection section based on the evaluation value that is calculated based on the certainty that the object included in the video is selected. As a result, the image recognition device accurately selects the sub-category and extends the section in which the individual object identifier is applied.

The present invention is not limited to the above-described embodiments. For example, according to a deformation example, the individual recognizing unit may re-recognize the object included in the image by using the individual object identifier corresponding to the selected sub-category. Therefore, the image recognition device may improve the recognition accuracy of the object with respect to the image in the inspection section.

According to other deformation examples, if the determining unit determines that the inspection section is inappropriate, the section setting unit may change the position of the inspection section that occupied in the video instead of extending the inspection section. For example, if the determining unit determines that the inspection section is inappropriate, the section setting unit changes the position of the inspection section in such a way that the start time of the inspection section that is sequentially set is the end time of the current inspection section. Furthermore, according to another deformation example, if the position information of the place included in the image is added to each image of the video, the section setting unit may set the image, which corresponds to the place positioned within a predetermined distance range from the standard position specified in advance, in the inspection section. The predetermined distance range is set to a range of 10 km to 1 km corresponding to a facility, for example, a park, a station, or the like.

Furthermore, according to another deformation example, the evaluation value calculating unit may have the above-described certainty degree $D(t,j)$ or the prediction number $R(t,j)$ of the appearance object in the non-inspected section as an evaluation value. If the certainty degree $D(t,j)$ is the evaluation value, it is preferable that the inspection section setting unit firstly sets the inspection section to the shortest section and that the determining unit extends the inspection section every time the determining unit determines that the inspection section is inappropriate. If the inspection section gets longer, the number of objects recognized from the inspection section is increased. Therefore, the certainty degree D(t,j) becomes higher. Therefore, by gradually extending the inspection section, the image recognition device may properly set the length of the inspection section.

The computer program that makes the processor execute functions of the units included in the processing device may be provided to be recorded in a storage medium such as an optical medium or a magnetic storage medium.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An object identifying device, comprising:
   a memory; and
   a processor coupled to the memory and configured to
   extract a first feature amount from a first image data;
   generate a first identification result of the first image data based on the first feature amount and a first identifier which identifies a plurality of objects included in a first category, the first identification result indicating any one of the plurality of objects;
   select, based on the first identification result, a second category from among the second category and a third category, the second category including a second part of the plurality of objects, the third category being different from the second category and including a third part of the plurality of objects;
   extract a second feature amount from a second image data; and
   generate a second identification result of the second image data based on the second feature amount, the second category, and a second identifier which identifies the second part of the plurality of objects, the second identification result indicating any one of the second part of the plurality of objects.

2. The object identifying device according to claim 1, wherein, regarding each of a plurality of sub-categories with the second category and the third category, the processor calculates a certainty degree indicating the degree of possibility that a first object in the first image data is included in each of the plurality of sub-categories, and
   wherein the processor selects the second category which has the largest certainty degree.

3. The object identifying device according to claim 2, wherein the processor sets a section which includes the first image data from among a plurality of image data included in a video, and acquires an evaluation value indicating an adequacy of a length of the section based on the certainty degree and on a prediction value related to the number of objects included in the image in another section including the second image data, and
   wherein the processor determines whether the length of the section is appropriate based on the evaluation value.

4. The object identifying device according to claim 3, wherein the processor changes the section when the length of the section is determined to be inappropriate, and
   wherein the processor generates the second identification result if the length of the section is determined to be appropriate.

5. The object identifying device according to claim 3, wherein the processor increases the evaluation value as the certainty degree is higher or the number of objects indicated by the prediction value is larger.

6. A non-transitory storage medium storing image identification program that causes a processor to execute operations, the operations comprising:
   extracting a first feature amount from a first image data;
   generating a first identification result of the first image data based on the first feature amount and a first identifier which identifies a plurality of objects included in a first category, the first identification result indicating any one of the plurality of objects;
   selecting, based on the first identification result, a second category from among the second category and a third category, the second category including a second part of the plurality of objects, the third category being different from the second category and including a third part of the plurality of objects;
   extracting a second feature amount from a second image data; and
   generating a second identification result of the second image data based on the second feature amount, the second category, and a second identifier which identifies the second part of the plurality of objects, the second identification result indicating any one of the second part of the plurality of objects.

7. The storage medium according to claim 6, the operations comprising:
   regarding each of the plurality of sub-categories with the second category and the third category, calculating a certainty degree indicating a degree of a possibility that a first object in the first image data is included in each sub-category; and
   selecting the second category having the largest certainty degree.

8. The storage medium according to claim 7, the operations comprising:
   setting a section which includes the first image data from among a plurality of image data included in a video,
   calculating an evaluation value indicating an adequacy of a length of the section based on the certainty degree and on a prediction value related to the number of objects included in the image in another section including the second image data; and
   determining whether the length of the section is appropriate based on the evaluation value.

9. The storage medium according to claim 8, the operations comprising:
   changing the section when the length of the section is determined to be inappropriate; and
   generating the second identification result if the length of the section is determined to be appropriate.

10. The storage medium according to claim 8, the operations comprising:
    increasing the evaluation value as the certainty degree is higher or the number of objects indicated by the prediction value is larger.

11. A method of identifying an object comprising:
    extracting a first feature amount from a first image data;
    generating a first identification result of the first image data based on the first feature amount and a first identifier which identifies a plurality of objects included in a first category, the first identification result indicating any one of the plurality of objects;

selecting, based on the first identification result, a second category from among the second category and a third category, the second category including a second part of the plurality of objects, the third category being different from the second category and including a third part of the plurality of objects;

extracting a second feature amount from a second image data; and generating a second identification result of the second image data based on the second feature amount, the second category, and a second identifier which identifies the second part of the plurality of objects, the second identification result indicating any one of the second part of the plurality of objects.

12. The method of identifying an object according to claim 11, the method further comprising:

regarding each of the plurality of sub-categories with the second category and the third category, calculating a certainty degree indicating a degree of a possibility that a first object in the first image data is included in each sub-category; and selecting the second category having the largest certainty degree.

13. The method of identifying an object according to claim 12, the method further comprising:

setting a section which includes the first image data from among a plurality of image data included in a video, calculating an evaluation value indicating an adequacy of a length of the section based on the certainty degree and on a prediction value related to the number of objects included in the image in another section including the second image data; and determining whether the length of the section is appropriate based on the evaluation value.

14. The method of identifying an object according to claim 13, the method further comprising:

changing the section when the length of the section is determined to be inappropriate; and generating the second identification result if the length of the section is determined to be appropriate.

15. The method of identifying an object according to claim 13, the method further comprising:

increasing the evaluation value as the certainty degree is higher or the number of objects indicated by the prediction value is larger.

* * * * *